United States Patent [19]

Bouillet

[11] 4,081,144
[45] Mar. 28, 1978

[54] ELECTRICAL HOUSEHOLD APPLIANCE SUCH AS A MINCER OR GRINDER

[75] Inventor: André Bouillet, Cormelles-le-Royal, France

[73] Assignee: Moulinex, Societe Anonyme, Bagnolet, France

[21] Appl. No.: 764,577

[22] Filed: Feb. 1, 1977

[30] Foreign Application Priority Data

Feb. 10, 1976  France .................................. 76 03565

[51] Int. Cl.² ........................ B02C 18/10; B02C 18/16
[52] U.S. Cl. ................................ 241/37.5; 241/282.1; 366/214
[58] Field of Search .................... 241/36, 37.5, 199.12, 241/282.1, 282.2; 259/108, DIG. 26

[56] References Cited

U.S. PATENT DOCUMENTS

| 2,982,483 | 5/1961 | Heinemans | 241/282.1 UX |
| 3,493,022 | 2/1970 | Mantelet | 241/199.12 |
| 3,892,365 | 7/1975 | Verdun | 259/108 X |

FOREIGN PATENT DOCUMENTS

| 2,228,775 | 12/1972 | Germany | 259/108 |
| 2,228,189 | 1/1973 | Germany | 241/282.1 |

Primary Examiner—Roy Lake
Assistant Examiner—Howard N. Goldberg
Attorney, Agent, or Firm—Young & Thompson

[57] ABSTRACT

In an electrically operated household appliance, such as a foodstuff mincer or grinder, of the kind which comprises a casing the top of which supports a working bowl which is closed by a removable cover and in which rotate cutters driven by an electric motor which is disposed inside the casing and is controlled by at least one switch which has an operating key situated on the top part of the casing and is actuated by a skirt extending downwards from the cover. The cover comprises two parts connected telescopically, one part being constituted by the skirt and being displaceable relative to the other part which is a cap, between a lower position in which the skirt brings the operating key into the working position thereof, and an upper position in which the operating key is in its position of rest.

9 Claims, 3 Drawing Figures

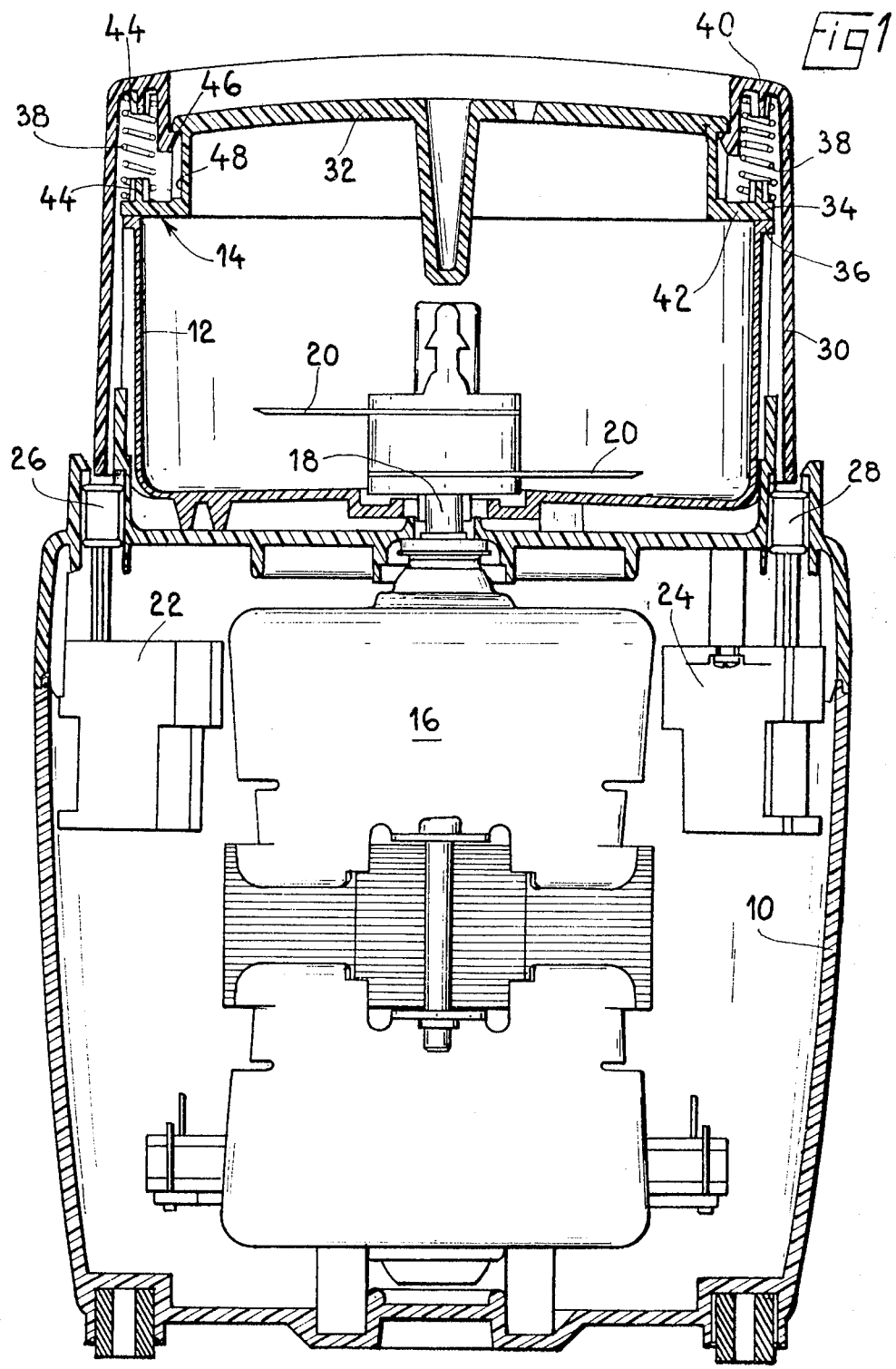

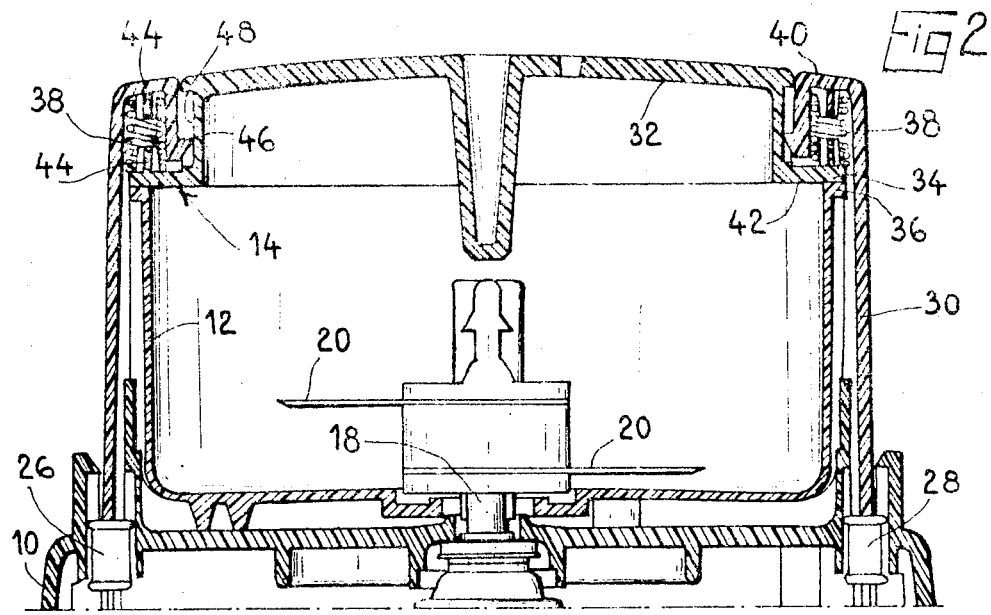
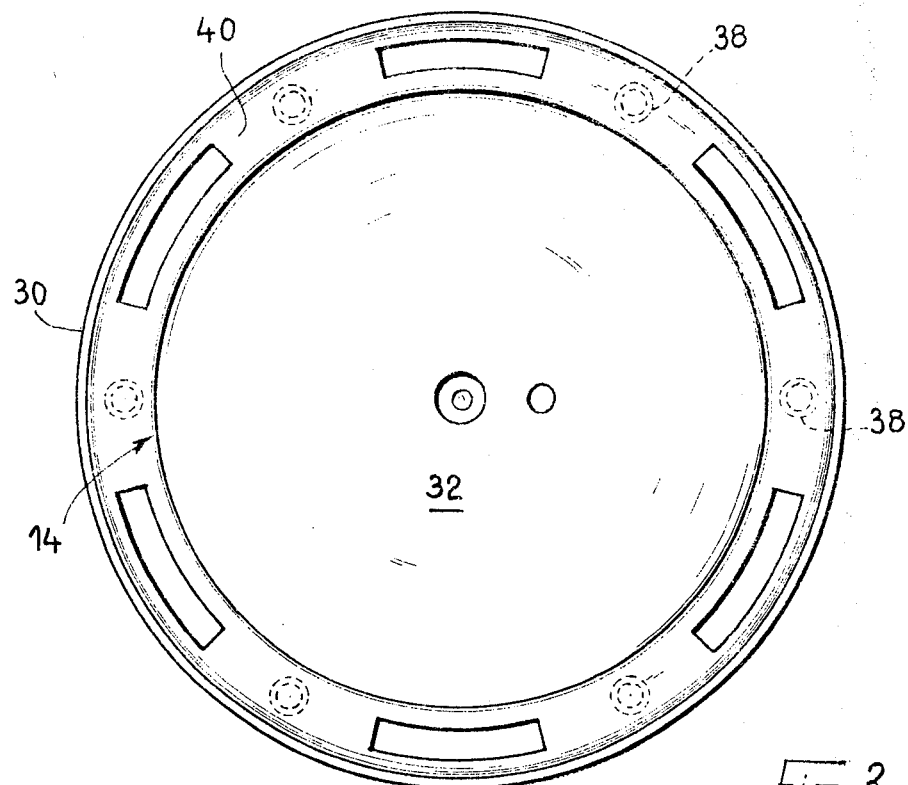

ELECTRICAL HOUSEHOLD APPLIANCE SUCH AS A MINCER OR GRINDER

BACKGROUND OF THE INVENTION

This invention relates to electrically operated household appliances, such as mincers or grinders for foodstuffs, comprising a casing the top of which supports a working bowl which is closed by a removable cover and in which rotate cutters driven by an electric motor which is disposed inside the casing.

The invention relates more particularly to an appliance of this kind in which the electric motor is controlled by at least one switch having an operating key which is situated on the top part of the casing, near the working bowl, and is actuated by a skirt extending downwards from the cover.

An appliance of this kind has been described in British Patent Specification No. 1,088,019.

In appliances of the kind referred to above the ground foodstuffs continue to circulate in the bowl for a short time after opening of the switch, that is to say after the cover has been lifted. When the foodstuffs are in the form of powder or contain powder, as is the case after the grinding of rusks or dried bread, the powder may escape from the bowl because of a clearance which then exists between the top edge of the bowl and the cover. The powder may then reach the switch key, with the risk of preventing it from working in a subsequent grinding operation.

It is an object of the invention to prevent escape of ground food from the bowl, either during the operation of the appliance or when the appliance is stopped.

SUMMARY

In an appliance of the kind referred to above the cover comprising two parts connected together telescopically, one part constituting a cap an outer edge of which is applied to the top edge of the bowl, and the other part being constituted by the skirt and being displaceable relative to the cap between a lower position in which the skirt brings the operating key into the working position thereof, and an upper position in which the operating key is in its position of rest.

As the result of this arrangement the cap remains applied against the top edge of the bowl after the telescopic skirt has been lifted, thus preventing escape of foodstuff from the bowl.

BRIEF DESCRIPTION OF THE DRAWINGS

FIG. 1 is a vertical section of an electrical household grinder according to the invention, with the skirt of a cover therefor in the higher position;

FIG. 2 is a partial view of FIG. 1 showing the skirt in the lower position for actuating a key for a switch; and FIG. 3 is a top plan view of the cover alone.

DESCRIPTION OF THE PREFERRED EMBODIMENT

Referring to the drawings, the household appliance comprises a casing 10 the top part of which supports a working bowl 12 closed by a detachable cover 14. In the casing 10 is disposed an electric motor 16 the output shaft 18 of which rotatably drives a pair of cutters 20 intended for finely mincing or grinding material contained in the bowl 12. The electric motor 16 is controlled by two switches 22 and 24 provided with operating keys 26 and 28 situated in the top part of the casing 10, near the bowl 12. The keys 26, 28 are actuated by a skirt 30 forming part of the cover 14.

The cover 14 comprises two parts connected together telescopically, one constituting a cap 32 which rests on its outer edge 34 against the top edge 36 of the bowl 12, while the other part constitutes the skirt 30 for actuating the keys 26 and 28 of the switches 22 and 24. The skirt 30 is displaceable vertically in relation to the cap 32 between a lower position (FIG. 2), which it brings the keys 26 and 28 into the working position (both switches closed) and a higher position (FIG. 1) in which the keys 26 and 28 are in the position of rest (both switches open).

The skirt 30 is returned to the upper position (FIG. 1) by resilient means such as a series of helical springs 38 disposed between a substantially horizontal flange 40 directed towards the interior and carried by the upper part of the skirt 30, and a likewise horizontal flange 42 situated under the flange 40 and rigid with the outer edge 34 of the cap 32. Each flange 40 and 42 has a series of seats formed by small bosses 44, each of which receives one end of the springs 38.

The connection between the skirt 30 and the cap 32 is made by a series of inwardly directed barbs 46 carried by the skirt 30 and engaged, with clearance in the vertical direction, in an annular recess 48 provided in the lateral surface of the cap 32.

As soon as the cover 14, composed of the cap 32 and the skirt 30, is placed on the appliance, the edge 34 of the cap comes to rest on the top edge 36 of the bowl 12 in a substantially fluid-tight manner. The lower edge of the skirt 30 is then spaced from the switch keys 26 and 28, as shown in FIG. 1. The appliance is in the position of rest.

In order to operate the appliance, that is to say to apply current to the motor 16, the user applies a downward pressure to the skirt 30 against the action of the springs 38. The skirt 30 then moves downwards in relation to the cap 32, until the skirt 30 reaches the position shown in FIG. 2, in which position the two keys 26 and 28 are driven into their working position; the motor 16 receives current and the cutters 20 rotate in the bowl 12.

When the user releases the skirt 30, the skirt rises automatically through the action of the springs 38, without the cap 32 being moved, until the skirt again reaches the position shown in FIG. 1 in which the motor receives no current.

Thus, since no space exists between the edges 34 and 36 of the cap and bowl either during the operation of the motor or when the motor is stopped, there is no risk of food escaping from the bowl 12 as long as the user leaves the cover 14 on the appliance.

I claim:

1. An electrically operated household appliance such as a grinder or mincer, comprising a casing the top of which supports a working bowl which is closed by a removable cover and in which rotate cutters driven by an electric motor which is disposed in the casing and is controlled by at least one switch having an operating key which is situated on the top part of the casing, near the said bowl, and is actuated by a skirt extending downwards from the cover, wherein the cover comprises two parts connected together telescopically, one part constituting a cap an outer edge of which is applied to the top edge of the bowl, and the other part being constituted by the skirt and being displaceable relative to the cap between a lower position, in which the skirt brings the operating key into the working position thereof, and an upper position in which the operating key is in its position of rest.

2. An appliance according to claim 1, wherein the skirt is returned to its upper position by resilient means.

3. An appliance according to claim 2, wherein the resilient means are interposed between the cap and the skirt.

4. An appliance according to claim 3, wherein the top part of the skirt is provided with a substantially horizontal flange directed inwards and the outer edge of the cap has a substantially horizontal flange situated under the flange of the skirt, and wherein the resilient means comprise a series of springs interposed between the flanges.

5. An appliance according to claim 4, wherein the springs are coil springs and each flange has a series of seats each of which receives one end of a spring.

6. An appliance according to claim 5, wherein the skirt and the cap are connected telescopically to one another by means of at least one barb carried by one of them and engaged with clearance in a recess provided in the other.

7. An appliance according to claim 6, wherein the skirt carries a series of barbs directed inwards, while the recess receiving the barbs in a single annular cavity provided in the side surface of the cap.

8. An appliance according to claim 1, wherein the skirt and the cap are connected telescopically to one another by means of at least one barb carried by one of them and engaged with clearance in a recess provided in the other.

9. An appliance according to claim 8, wherein the skirt carries a series of barbs directed inwards, while the recess receiving the barbs is a single annular cavity provided in the side surface of the cap.

* * * * *